United States Patent Office 3,438,579
Patented Apr. 15, 1969

3,438,579
APPARATUS FOR FLAME SPRAYING POWDERED MATERIALS
Randolph A. Wiese, Houston, Tex., assignor to Powder Weld International Corporation, Houston, Tex., a corporation of Texas
Filed June 28, 1967, Ser. No. 649,656
Int. Cl. B44d 3/60
U.S. Cl. 239—85                                14 Claims

ABSTRACT OF THE DISCLOSURE

The present invention generally relates to improved apparatus for flame spraying powdered material. The invention utilizes three gases to form a flame, convey the powdered material into the flame and shroud the flame from the atmospheric conditions.

Background of the invention

The present invention relates to the field of flame spraying a powdered material such as various plastics and metals onto objects. Such spraying is used, for example, to form coatings on the sprayed objects for resistance to wear, corrosion and the like. Due to the melting of the powdered material by the heat generated from the flame, a bond is formed between the melted coating material applied and the object being coated.

Flame spraying of powdered materials is known in the art as is exemplified by the patents to Wiese, No. 2,549,736, Apr. 17, 1951, and Jones et al., No. 2,726,118, Dec. 6, 1955. Those systems and methods utilize a fuel gas and a combustion sustaining gas which are emitted from a tool or torch and ignited to form a flame. A third gas is conveyed to a powdered material source. This gas picks up the powdered material and carries it to the torch where it is forced into the flame. The heat melts the material as it is sprayed onto the desired object to form a secure bond. A fourth gas is ejected from the torch around the flame and powdered material to provide a shield or shroud against atmospheric or ambient conditions that could affect the resultant coating.

Summary of the invention

The present invention presents improved apparatus for flame spraying. A unique arrangement of parts provides a simplification of the equipment and requires only three independent gas sources. The present invention also allows control over the process by utilizing an improved tool or torch which has located thereon the controls for the process. The powdered material and the shroud controls are located, due to improvements in the torch, for operation by the same hand with which the operator is using to operate the torch, thereby making the spraying a one-handed operation to a large extent. Adjustments are also provided to adjust the shroud, whereby the configuration of the coating applying flame may be changed to give a better pattern for application purposes. The improved torch is simple and economical to produce and operate as is the system in its entirety. Improved powdered material supplying equipment has been provided to give a more even flow or supply of material to the torch.

It is, therefore, an object of the present invention to provide improved apparatus for the application of coatings by flame spraying.

A still further object of the present invention is to provide apparatus that will be simple and economical to produce and to operate while providing improved and easier control over the operation as well as reliability and long life.

Another object of the present invention is to provide improved flame spraying apparatus which may be operated to a great extent with one hand, thereby freeing the other hand for other duties such as moving the object being sprayed.

A still further object is to provide flame spraying apparatus having improvements in the torch and in the powdered material supplying apparatus.

Other and further objects, features and advantages will be apparent from the following description of a presently preferred embodiment of the invention given for the purpose of disclosure, and taken in conjunction with the accompaying drawings.

Brief description of the drawings

In the drawings, like character references designate like parts throughout the several views which are as follows.

Description of the preferred embodiment

Figure 1:
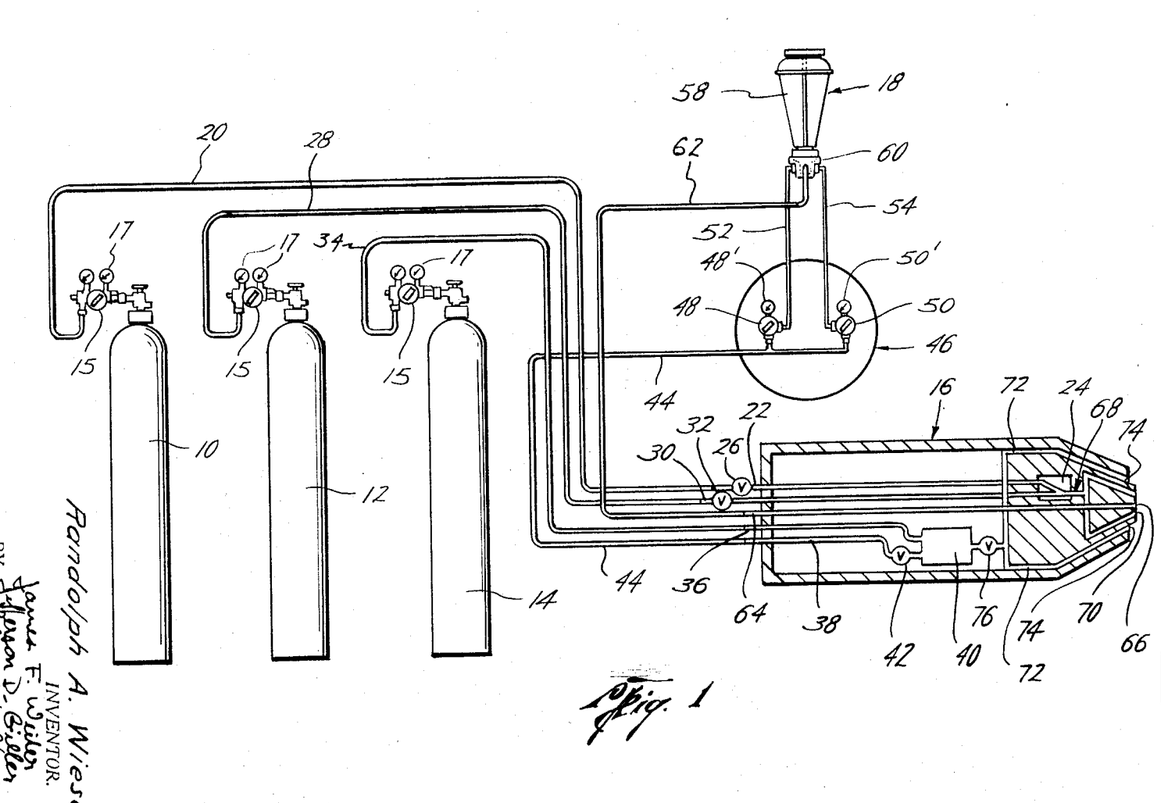
FIGURE 1 is a schematic diagram of the apparatus utilized in the preferred embodiment of the invention.

Turning now to FIGURE 1, there is shown a schematic diagram of the present system of flame spraying powdered material (hereinafter called "powder"). This embodiment consists generally of a fuel gas source in the form of a tank 10, a flame sustaining gas (hereinafter called "oxygen") source in the form of a tank 12, a shroud and carrier (hereinafter called "carrier") gas source in the form of a tank 14, a flame spraying torch 16 and a powder source in the form of a container 18. At the outlets of each tank are a high pressure reducing regulator 15 and a pressure gauge 17. The tank 10 is connected to the flame spraying torch or tool 16 by means of a flexible conduit or hose 20. The hose 20 mates with a tubular member 22 which extends into the torch to the compartment 24. A valve 26 regulates the flow of the fuel gas through the tubular members 20 and 22. The oxygen tank 12 is connected by means of a hose 28 to a tubular member 30 which also extends to the compartment 24 and contains a control valve 32.

The tank 14 is connected by a hose 34 to a tubular member 36. The tubular member 36 extends into the torch to a second compartment 40. Another tubular member 38 extends from the compartment 40 to the rear of the torch 16 and contains therein a valve 42. This tubular member 38 is attached to a hose 44 which connects with a proportioner assembly, generally indicated at 46.

The conduit 44 divides and connects with pressure reducing regulators 48 and 50, each of which carry pressure gauges 48' and 50'. Extending from the lower pressure side of these regulators are tubular members 52 and 54 which connect the regulators 48 and 50, respectively, to the powder supply source which is generally indicated at 18.

The powder supply source is comprised generally of a powder container or hopper 58 and a solid-state carburetor or powder entraining chamber 60. The tubular members 52 and 54 connect with the carburetor on top of which the powder hopper is mounted for gravitational feed of powder into the carburetor. Extending from the carburetor is an outlet hose 62 which connects with a tubular member 64 at the rear of the torch 16. The tubular member 64 extends the entire length of the torch and terminates in a centrally disposed opening 66 in the nozzle end of the torch.

Returning now to the fuel gas and oxygen feeding arrangement, extending from the first compartment 24 is a passageway means 68 which communicates with a series of openings 70. These openings are concentrically disposed about the central opening 66. A second passageway means 72 communicates with the second compartment 40 in the torch and connects this compartment with a series of openings 74 also in the nozzle end of the torch 16. A final valve 76 is located in the passageway means 72 for the regulation of the gas passing from the compartment 40 to the openings 74. The particular arrangement of the passageway means 68 and 72 will be more fully set forth below as will be the specific features of the other pieces of apparatus contained in this embodiment of the present invention.

Figure 2:
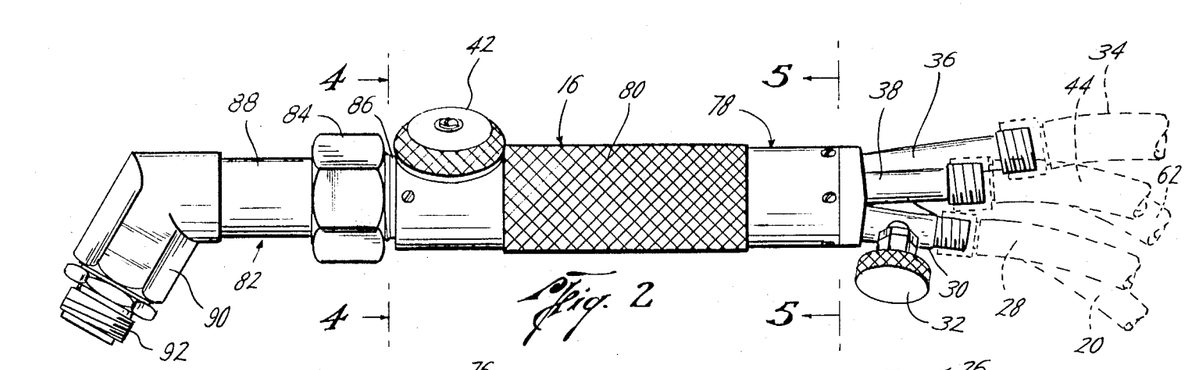
FIGURE 2 is a side view of the torch utilized in the present invention with the nozzle portion removed.
Figure 3:
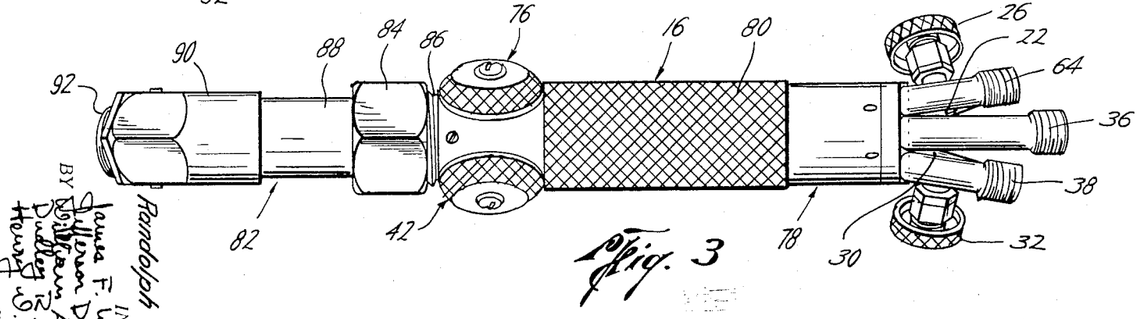
FIGURE 3 is a top view of the torch shown in FIGURE 2.

Turning now to FIGURES 2 and 3, there is shown in an enlarged scale a side and top view respectively of the torch used in the preferred embodiment of the present invention. In these views, the nozzle portion has been removed from the torch and the flexible conduits or hoses 20, 28, 34 44 and 62 are shown only in broken lines in FIGURE 2. In FIGURE 2, the powder conveying tube 64 and the fuel gas tube 22 cannot be seen when viewed at this angle.

The torch 16 includes a handle portion 78 which has a knurled or scarfed section 80 for gripping purposes. Located adjacent the gripping section are valves 42 and 76, the purposes of which will be set forth below. Threadedly engaged with the end of the handle portion 78 opposite the tubular connections, is a front tube assembly generally indicated at 82. The assembly 82 is attached to the handle portion 78 by means of the nut 84 threadingly engaging the threads 86 on the handle portion 78 and seating against the shoulder 112 on the assembly 82 (see FIGURE 9). Extending from the nut 84 is a hollow shank portion 88 which connects with a head unit 90. The head unit 90 is a solid block having passageways drilled therethrough for the passage of the gases as will be explained. Extending out of the head unit 90 and in threaded engagement therewith is a nozzle seat block 92.

Figure 4:
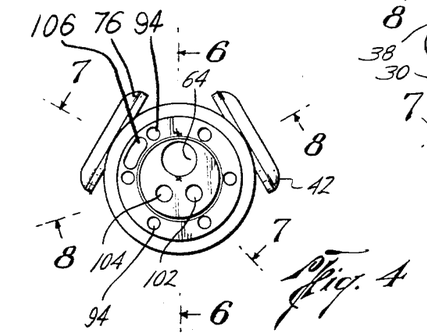
FIGURE 4 is an end view of the torch of FIGURE 2 taken along section line 4—4 of FIGURE 2.
Figure 5:
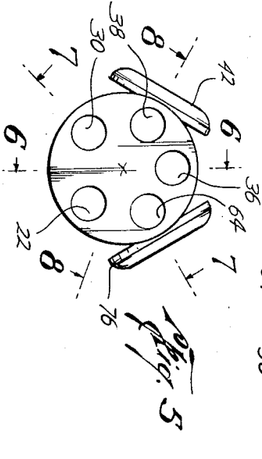
FIGURE 5 is an end view of the torch of FIGURE 2 and taken along section line 5—5 of FIGURE 2.
Figure 6:
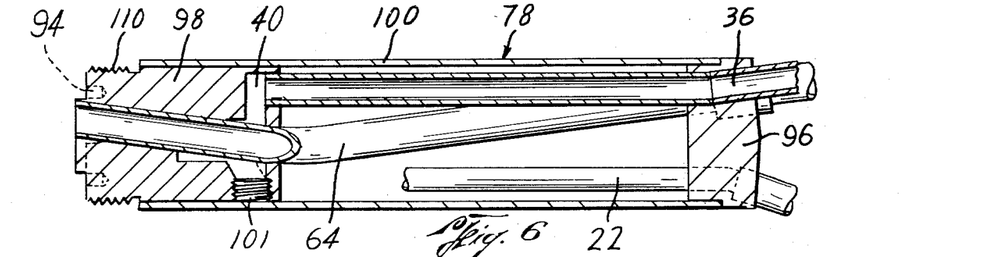
FIGURE 6 is a section view of the torch taken along section line 6—6 of FIGURES 4 and 5, parts thereof being removed for clarity of illustration.

Turning now to FIGURES 4, 5, 6, 7 and 8, these figures are included to show the particular arrangement of the tubular members in the handle assembly. Some of the tubular members are not shown or are only partially shown in these figures to avoid confusion. FIGURES 4 and 5 represent the torch unit shown in FIGURES 2 and 3 as seen from views taken along section lines 4—4 and 5—5, respectively. In FIGURE 4, for purpose of clarity, the tubular members extending from the rear of the torch handle assembly 78 are not shown. This is also true in FIGURE 5 of the downwardly extended head portion 90 and nozzle seat block 92. In FIGURE 5 the tubular passageways 22, 30, 36, 38 and 64 which extend into the torch can be seen. In FIGURE 4, locating pin holes 94 are shown which co-act with mating pins on the front tube assembly 82 for proper alignment of the front tube assembly with the handle assembly.

The handle assembly 78 is comprised generally of a rear block 96 and a front valve block 98. Connecting the two blocks 96 and 98 is a cylindrical housing 100 which may be attached to the blocks by any conventional means such as welding or the use of screws. In the front block 98 are the locating pin holes 94, which are not shown in FIGURES 7 and 8 for purpose of simplicity. The compartment 40 is a generally L-shaped compartment formed in the front valve block 98. This compartment may be formed by drilling through access openings such as opening 101 shown in FIGURE 6. When the compartment is completed these openings are threaded and closed by threaded plugs.

The powder supply tube 64 enters the handle assembly 78 near the top right hand side as viewed in FIGURE 5. The tube 64 extends generally through the center of the compartment 40 and out the forwardmost end, as seen in FIGURE 4. The tube 36 which carries the carrier gas to the compartment 40 enters the rear of the handle assembly at the top center portion thereof and extends generally parallel to the cylindrical housing 100 until it reaches compartment 40.

Figure 7:
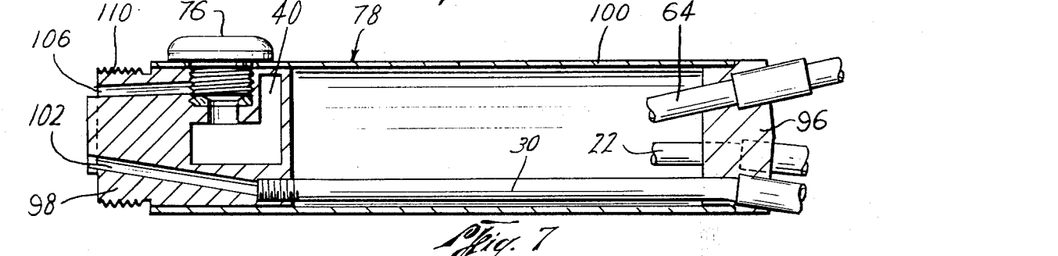
FIGURE 7 is a section view of the torch taken along section line 7—7 of FIGURES 4 and 5, portions of the torch being removed for clarity of illustration.
Figure 8:
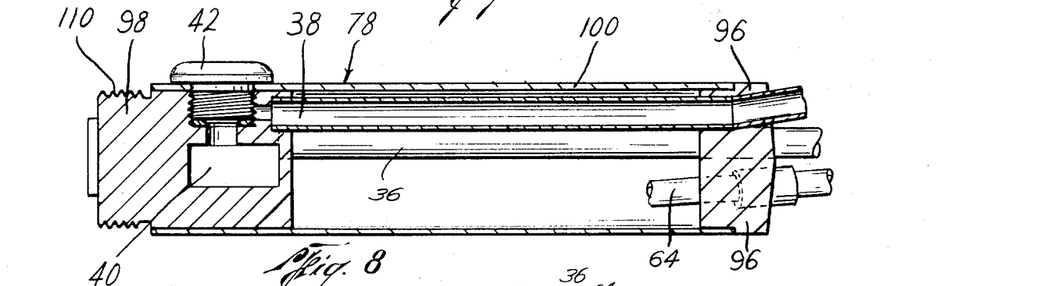
FIGURE 8 is a section view of the torch taken along section line 8—8 of FIGURES 4 and 5, portions thereof being removed for clarity of illustration.

In FIGURE 8, it can be seen that the tubular member 38 carrying the carrier gas from compartment 40 to hose 44 also runs essentially parallel to the housing 100. This tubular member extends from the valve 42 and out of the rear block 96 through the upper left hand portion as seen in FIGURE 5. In FIGURE 7, tubular member 30 which carries the oxygen is shown. This tubular member also passes essentially parallel to the cylindrical housing 100 after entering from the lower right hand corner as viewed in FIGURE 5. The tubular member 30 is connected to the front valve block 98 by suitable means such as being in threaded engagement as is shown. Extending at an upward angle from the tubular member 30 is a passageway 102. The companion tubular member 22 (only partially shown in FIGURE 7) which carries the fuel gas also runs parallel to the housing 100. A passageway 104, shown in FIGURE 4, angles upwardly through the valve block 98 from the connection (not shown) of tubular member 22 with the valve block 98 to carry the fuel gas through the valve block 98.

Figures 9, 10, 11, 12:
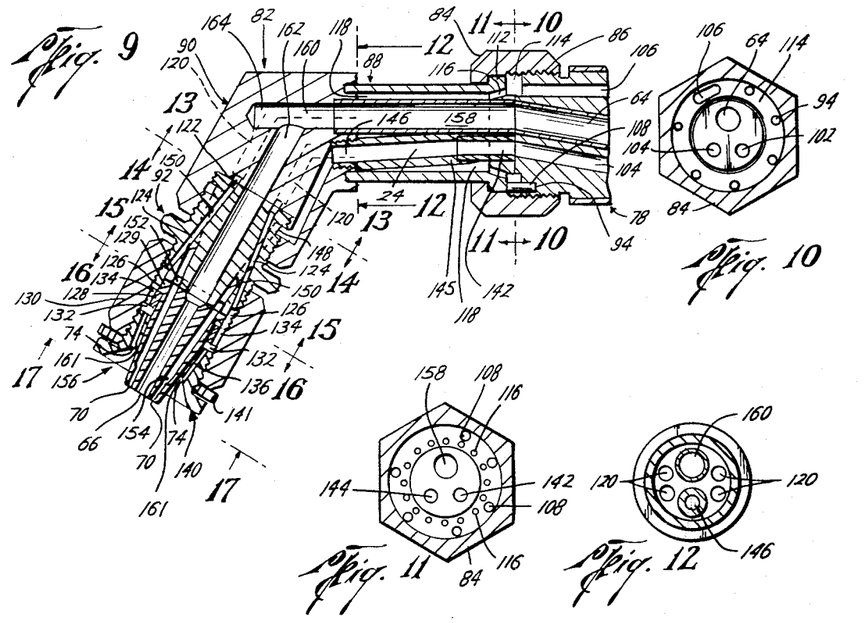
FIGURE 9 is a side section view of the front portion of the torch taken along section line 9—9 of FIGURE 3 and showing the nozzle section attached.
FIGURE 10 is a section view of the torch taken along section line 10—10 of FIGURE 9.
FIGURE 11 is a section view of the torch taken along section line 11—11 of FIGURE 9.
FIGURE 12 is a section view of the torch taken along section line 12—12 of FIGURE 9.
Figure 13:
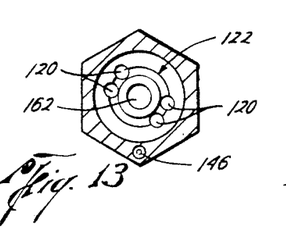
FIGURE 13 is a section view of the torch taken along section line 13—13 of FIGURE 9.
Figure 14:
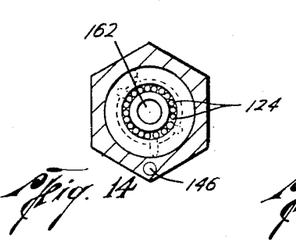
FIGURE 14 is a section view of the torch taken along section line 14—14 of FIGURE 9.
Figure 15:
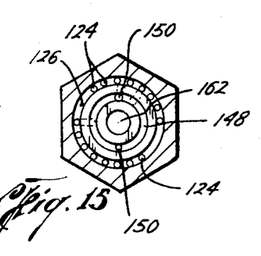
FIGURE 15 is a section view of the nozzle and nozzle nut holder taken along section line 15—15 of FIGURE 9.
Figure 16:
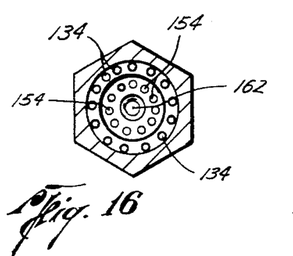
FIGURE 16 is a section view of the nozzle and nozzle nut holder taken along section line 16—16 of FIGURE 9.

In FIGURES 9–17, the front tube assembly 82 and the nozzle portion are disclosed in various sectional views. Referring generally to FIGURE 9, the attachment of the front tube assembly 82 onto the handle assembly 78 by the nut 84 has been explained, as has been the arrangement of the hollow stem 88, the generally solid head 90 and the nozzle seat block 92. Only one pin hole 94 on the handle assembly, and mating pin 108 on the front tube assembly are shown although a plurality of these are used. A nozzle nut holder 130 is threadingly engaged with the seat block 92 and secures the nozzle 156 onto the torch by the action of the radially extending, internal flange 128 urging the flange 129 on the nozzle against the seat block 92. A shroud gas cap 140 is in threaded engagement with the nut holder 130 for adjustment relative to the nozzle by rotation of the cap in its threaded engagement. When the cap 140 has been adjusted as desired, it is locked in place by rotation of the lock nut 141.

Referring now to FIGURES 9–17, the shroud gas passageway 106 communicates with the annular passageway 114. In FIGURE 9, the passageway 106 has been rotated from its true position which is shown in FIGURES 4 and 10 to a position at the top of the handle assembly for purposes of illustration. Communicating with the annular passageway 114 are the passageways 116 which communicate with the open area 118 in the shank portion 88 of the front tube assembly. Four openings 120, two of which are positioned on each side of the assembly, are located in the head unit 90 and communicate with the open area 118. Two of these openings may be seen in broken lines in FIGURE 9. These openings communicate with an annular opening 122 which in turn communicates with the passageways 124, only two of which are shown in FIGURE 9. These passageways extend through the nozzle seat block 92 and terminate at the annular opening 126 which is defined by the end of the nozzle seat block 92 and the downwardly extending flange 128 in the nozzle nut holder 130. On the opposite side of the flange 128 is a second annular passageway 132 which is connected by passageways 134 to the annular opening 126. Finally, passageways 136 extend from this last-mentioned annular opening 132 to the openings 74 in the nozzle cap 140.

Turning now to the supply of the fuel and oxygen, the passageways 102 and 104 communicate with the passageways 142 and 144, respectively. These passageways merge into a compartment generally indicated at 24 which is the oxygen and fuel gas mixing chamber and is formed by the tubular member 145 and which communicates with the passageway 146. The passageway 146 makes an upward turn at its end opposite the compartment 24 and mates with the annular passageway 148 in the nozzle seat block 92. Communicating with this annular passageway 148, are two passageways 150 which lead to a second annular opening or passageway 152. Communicating with this opening 152 and extending through the nozzle 156 are a plurality of passageways 154. These passageways terminate in the openings 70 which are concentrically disposed about the center point of the nozzle 156.

Finally, the powder entraining gas conveying tubular member 64 mates with the tubular member 158 which extends through the stem portion 88 and connects with the head portion 90. Drilled passageways 160 and 162 connect the tubular member 158 to the centrally disposed nozzle opening 66 in the nozzle 156. The passageway 160 is drilled beyond its juncture with passageway 162 as at 164, the purpose of which will be set forth below.

Figure 18:
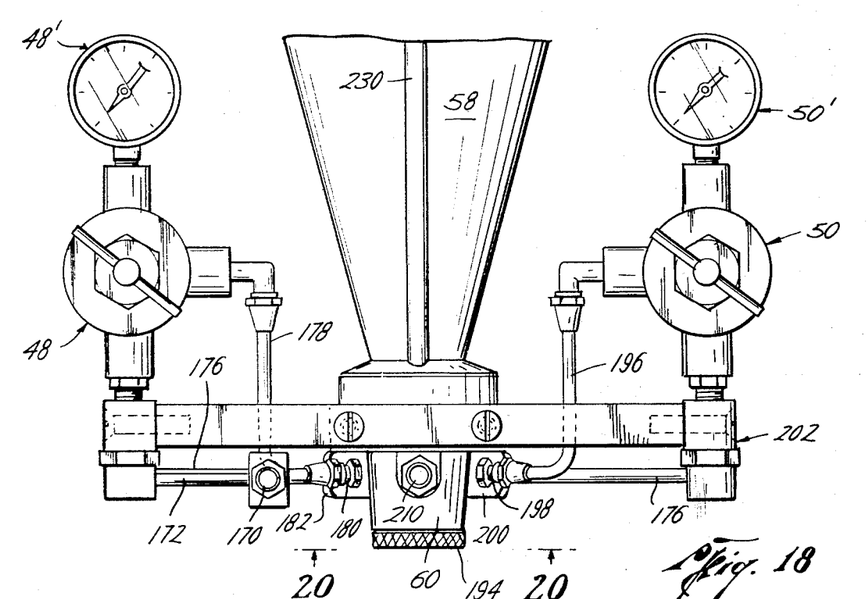
FIGURE 18 is a front view of the proportioner and powdered material supply assembly utilized on this preferred embodiment of the present invention.
Figure 19:
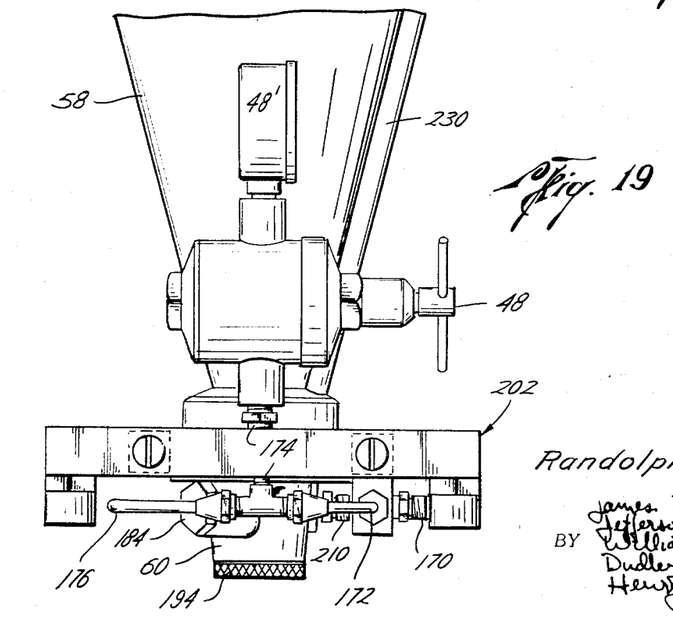
FIGURE 19 is a side view of the apparatus shown in FIGURE 18.

Turning now to the powder supply apparatus, there is shown in FIGURES 18 and 19 the proportioner assembly which includes the regulators 48 annd 50 with their accompanying pressure gauges 48′ and 50′. The hose 44 extending from the torch 16, connects with the proportioner assembly by attachment to the nozzle 170. The tube 172 connects with and extends from the nozzle 170 and leads to the high pressure side of the regulator 48 by means of the tubular connection 174.

The tubular member 176 branches off of tubular members 172 and 174 and extends to the rear of the proportioner assembly, as viewed in FIGURE 18, where it makes a right angle turn and extends across the rear of the proportioner assembly. The tube 176 connects with the regulator 50 by means of an upstanding tube (not shown) in the same manner as does the upstanding tube 174 connect the tube 172 to the regualtor 48.

Figures 20, 21, 22:
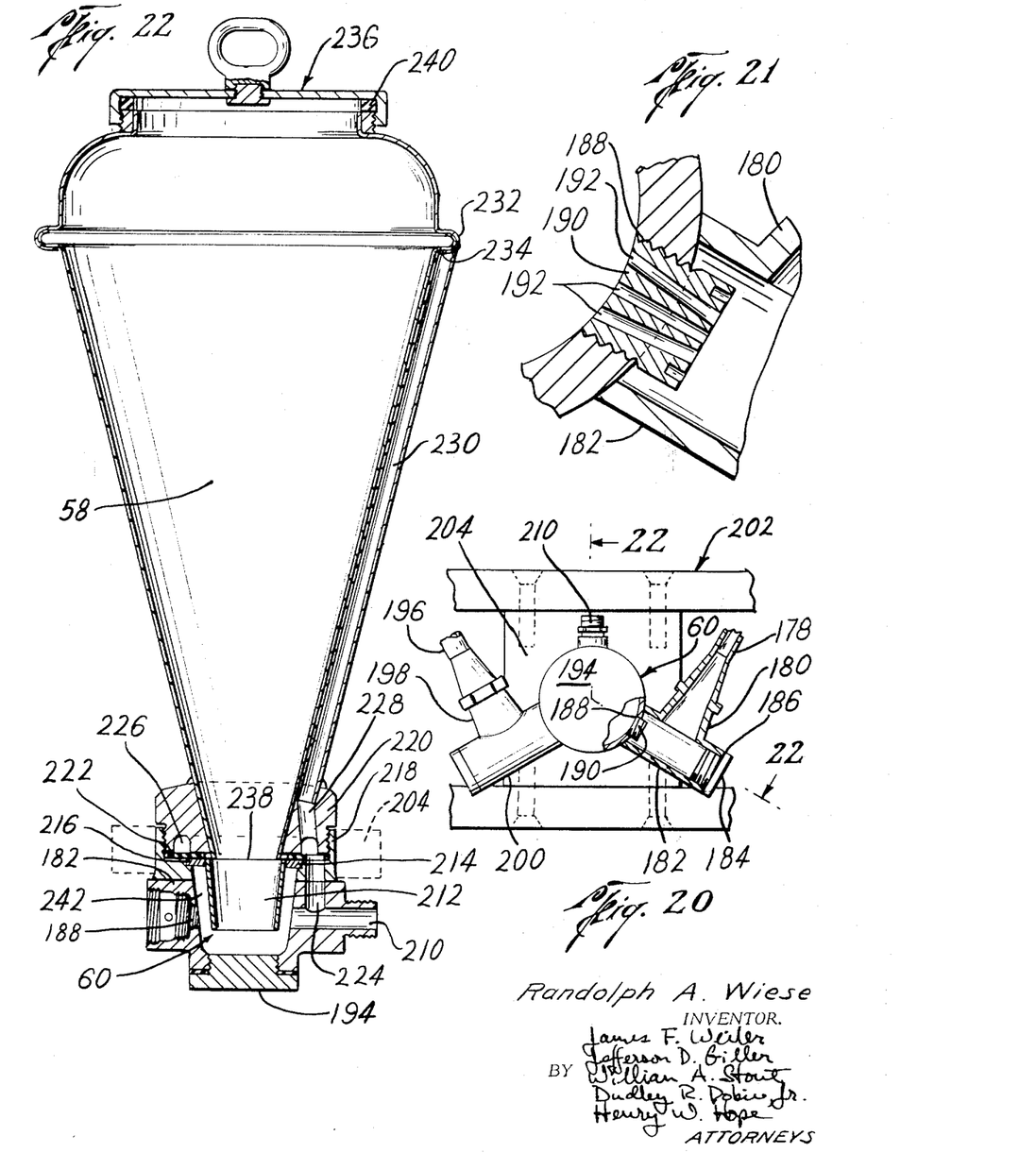
FIGURE 20 is a bottom view of the carburetor portion of the material supply apparatus taken along section line 20—20 of FIGURE 18.
FIGURE 21 is a partial view of the carburetor portion showing the element 190 as attached to the carburetor portion in an enlarged scale.
FIGURE 22 is a side section view of the carburetor and powder container taken along section line 22—22 of FIGURE 20 and showing the full length of the powder container.

Extending from the low pressure side of the valve 48 is tubular member 178 which connects to the input nozzle 180 on the carburetor 60. As seen in FIGURE 20, the input nozzle 180 is mounted on a projecting cylindrical housing 182 which is attached to the side of carburetor 60 and extends radially outwardly therefrom. An end cap 184 provides access to the housing 182 and a gasket 186 between the cap 184 and the housing insures a tight seal. The cap 184 and the interior of the housing are threaded to provide a means of attaching the cap to the housing.

An opening 188 extends through the sidewall of the carburetor 60 and is threaded for engagement with the plug 190. This is more clearly shown in the enlarged view of this portion of the apparatus shown in FIGURE 21. Multiple openings or jets 192 extend through the plug 190. The direction of these openings may be varied to provide a more effective distribution of the carrier gas as it is injected into the carburetor. Access to the carburetor itself is provided by means of a plug 194 which threadingly engages the bottom portion of the carburetor 60 as shown in FIGURE 22.

A similar arrangement is provided for the valve 50. A tubular member 196 connects the valve 50 to a nozzle 198 on a housing 200. The housing 200 also has a plug 200′ (not shown) corresponding to plug 190 for communication with the interior of carburetor 60. The plug 200′ contains jets 192′ similar to jets 192. In the preferred embodiment disclosed herein, the jets 192′ are larger than the jets 192, and are directed generally toward the bottom of chamber 60, whereas jets 192 extend generally parallel to the bottom for purposes to be explained.

The carburetor 60 and the regulators 48 and 50 are mounted on a support generally indicated at 202. The support is comprised of four elongate bracing members which are connected at their ends to form a rectangle. A supporting plate 204 is attached to two of the elongated bracing members as is seen in FIGURE 20 by the use of screws (shown in broken lines). The carburetor 60 and powder container 58 are supported by this plate 204.

Shown in FIGURES 20 and 22 is the outlet 210 which extends from the carburetor chamber. Thread means are provided on the outermost end of the outlet 210 for attachment to the flexible conduit 62, shown in FIGURE 1.

Referring now to FIGURE 22, a section view of the powder supply apparatus is shown. This section view is taken along section line 22—22 of FIGURE 20 with the housing portion 182 rotated approximately 45 degrees from its position shown in FIGURE 20 so that a side section view of its may be shown. The end cap 184 and the plug 190 have been removed from the compartment 182 for purposes of illustration.

As can be seen in FIGURE 22, the carburetor is comprised of a chamber having walls that incline inwardly from the top to the bottom. A metering tube 212 extends from the top of the carburetor chamber 60 into the chamber itself. A peripheral flange 214 at the top of the metering tube 212 rests on a shoulder 216 formed near the top of the carburetor chamber to support the metering tube in its proper position. The walls of the metering tube converge downwardly so that it assumes the shape of a frustum of a hollow cone. An annulus 242 is formed by the interior of the chamber 60 and by the exterior of metering tube 212. It is understood, of course, that the walls of both the chamber 60 and metering tube 212 may be vertical and both would still operate properly.

The base member 220 of the powder container 58 is threadedly engaged to an upwardly extending circular nozzle 218 which is a part of the carburetor 60. A gasket 222 forms the seal between the base member 220 and the nozzle 218 of the carburetor. The opening 238 in the bottom of container 58 provides a means for the flow of powder into the carburetor 60 through metering tube 212. A lid arrangement 236 is provided for the top of the powder container to provide an airtight enclosure with sealing being accomplished by the use of a gasket 240.

Extending upwardly from the passageway which connects the outlet 210 with the carburetor chamber is a passageway 224 which communicates with the annular opening 226 by means of an opening in the gasket 222. Extending upwardly from this annular opening is another passageway 228 which connects with the tubular portion 230. Tube 230 extends substantially the entire height of the powder container 58 to the flange 232. An opening 234 in the lower part of flange 232 allows the tube 230 to communicate with the interior of the powder chamber. Accordingly, due to the by-pass formed by passageways 224, 226, 228 and 230 and by opening 234, the upper portion of the powder container 58 is in communication with the outlet 210.

Turning now to the operation of the present invention, the pressure reducing regulators 15 on the fuel gas and on the oxygen and carrier gas sources 10, 12 and 14 are opened. The gases travel through their respective conduits 20, 28 to 34 to their connections with the torch 16. Even though the regulators 15 on the gas sources have been opened, the closed valves on the torch, i.e. 26, 32, 42 and 76, will prevent any conveying or emitting of the gases from the torch.

To ignite the flame, the valve 26 is opened to allow the fuel gas to flow through the tubular member 22, passageways 104 and 142 to the chamber 24, and finally through the openings 70. A variety of fuel gases may be used, some of the more common being acetylene, propane, butane, hydrogen and natural gas. In a similar manner, the valve 32 is opened allowing the oxygen to flow through the passageways 30 and 102 to the chamber 24. The oxygen and fuel gas become intermixed in chamber 24 and pass into the passageway 146 to the annular opening 148. From this annular opening the mixture is forced through the passageways 150 and 154 and is ejected under pressure out of the openings 70 in the nozzle 156. This combustible mixture will burn to provide heat to melt the powder to be sprayed. The flame also affords heat to preheat or afterheat the surface being coated. The valves 26 and 32 may be adjusted to vary the quantities of the gases supplied to the flame as desired to control the amount of heat released. The pressure reducing regulators 15 on the fuel gas and oxygen tanks, 10 and 12, may also be adjusted to control the amount of gases flowing into the flame for additional or alternate control over the amount of heat released.

To begin the actual coating operation, the valve 42 is opened to allow a desired amount of carrier gas to pass through the tube 38. This gas has previously been introduced into the chamber 40 through the tubular member 36 and will pass through the flexible conduit 44 and into the proportioner assembly. Here, a portion of the carrier gas will pass through the tubular member 174 and into the regulator 48. The remainder will flow through the tubular member 176 to the regulator 50. In this manner, the jets 192 connecting the housing 180 with the interior of the carburetor chamber 60 are supplied with a selected volume and pressure of gas. The second set of jets 192' in the housing 200 may be supplied with a wholly separate volume and pressure of gas through regulator 50. The gauges 48' and 50' are on the low pressure or delivery side of the pressure reducing regulators 48 and 50, respectively. They, therefore, indicate the input pressure on the group of carburetor jets to which they are connected, i.e., the gauge 48' indicates the input pressure to the jets 192. The regulators 48 and 50 can be adjusted to obtain the desired flow of carrier gas into the carburetor to regulate the powder flowing from the carburetor as will be explained.

The container 58 is filled to a predetermined level with the powdered material to be used in the coating. This powder is fed by force of gravity through the opening 238 and metering tube 212. As will be understood by one skilled in the art, the use of the proportioner assembly and of the regulators 48 and 50 allow the input pressure of the gas flowing to the jets to be controlled. The jets 192 located in housing 182 are preferably "high pressure jets" whereas the corresponding jets 192 located in housing 200 are relatively low pressure jets, the pressure at each being controlled by the regulators 48 and 50 respectively. The jets 192' are pointed downwardly in this preferred embodiment while the jets 192 extend generally parallel to the bottom of the chamber 60. In effect, the gas passing through jets 192' agitates the powder in chamber 60, keeping it moving throughout the chamber rather than just resting on the chamber bottom. The gas that is introduced through jets 192 moves generally in a horizontal path through the chamber and out the outlet 210. This gas picks up the powder that has been blown off of the chamber bottom by the downwardly directed gas streams and carries it out of outlet 210 to the torch. The pressure and volume of the gas entering through outlets 192 and 192' may be individually varied by use of regulators 48 and 50 to provide optimum conditions for the agitating and entraining of the powders. Furthermore, only one set of jets may be utilized if desired.

Further variations in direction and control of the carrier gas may be brought about by rotation or substitution of the plugs 190, or by re-arrangement of the jets 192 both in size and angle of entry. The meter tube 212 may also be shortened or lengthened. Variations may be made in the volume of the gas and the direction, both horizontally and vertically from which the gas is introduced. This provides a wide degree of flexibility which is needed due to the fact that both light plastics such as polythene, some polyvinyls, some silicones and some elastomers, and heavier metals, such as lead, silver, as well as zinc, aluminum and the like, may be sprayed by the present apparatus and that the powdered material may be made up of particles of varying size. As can be seen therefore, a variety of steps are available to regulate and control the amount of powder that is entrained by the carrier gas and carried into the flame, for example, the size and/or direction of the jets 192 and the corresponding jets in housing 200 can be varied, the pressure and/or the volume of the carrier gas can be varied and the length of the metering tube 212 can be varied.

Returning to the powder container itself and referring now to FIGURE 22, passageways 224, 226, 228 and 230 provide for an equalization of the pressure above the powder contained in the hopper with the pressure in the outlet 10. In this manner, pressure is built up above the powder in the hopper. This makes it possible to automatically purge or clean the tube 62 and the various tubular members and passageways in the torch which connect the tube 62 with the powder nozzle 66. The pressure above the powder in the container is controlled by the adjustment of regulators 48 and 50, by the size of jets 192 and 192' and by the resistance in the powder hose 62. Accordingly, this pressure will vary with the length of the hose. When the valve 42 is closed, there is always enough gas under pressure above the powder in the container 58 to purge the powder hose 62 and the passageways in the torch connecting the hose 62 with the opening 66, through by-pass tube 230 and associated passageways connecting tube 230 to the outlet 210.

As the powder entrained gas leaves the outlet 210, it travels through the conduit 62 to tubular member 64 which extends through the handle assembly 78 to the forwardmost face of the valve block 98. It then passes through passageways 158, 160 and 162 which terminates in the centrally disposed nozzle opening 66. The powdered material is ejected under pressure from the opening 66, as is the combustible mixture of oxygen and fuel gas emitted from the series of openings 70 which are disposed in a circular arrangement about the central opening 66.

As the powder enters the flame, it is melted. It is sprayed in this melted state onto the object being coated and forms a strongly adherent bond to the object. The proper melting of the powder at selected temperatures can bring about a wide variety of results as far as the coating being applied and the bond which is established between the coating and the object. Accordingly, materials ranging from light plastic compositions having relatively low melting temperatures to heavy metallic powders having relatively high melting temperatures may be applied with this same piece of equipment.

A shroud of gas is ejected from the nozzle around the flame and powder. With some powdered materials, such as aluminum and zinc, air is used as the shroud and carrier gas and the primary function of the shroud is to assist in shaping and directing the flame and melted powder pattern, as will be explained, to better control the application of the powders. With other metals having a high oxidation rate, such as silver, an inert gas will be used as the shroud and carrier gas to shroud the flame and powder to perform the additional function or protecting these metals from oxidation.

Figure 17:
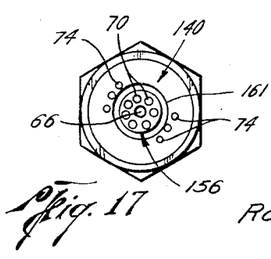
FIGURE 17 is an end view of the nozzle taken along line 17—17 of FIGURE 9.

The volume and pressure of this shroud gas is varied by rotation of the thumb valve 76 which, as can be seen in FIGURE 7, will allow gas to flow from the compartment 40 into the passageway 106. From this passageway, the shroud gas flows through the annular compartment 114, passageways 116, open area 118, passageways 120 and 122, and passageways 150 which are in the nozzle seat block 92. The shroud gas then passes from the annular openings 126 through the passageways 134, 132 and 136 from which the gas is emitted through openings 74. As can be seen in FIGURE 17, there are six of these openings 74 disposed on opposite sides of the centrally disposed opening 66.

In addition, the shroud gas emits from an annulus 161 which is formed by the exterior sidewall surface of nozzle 156 and the interior sidewall surface of the shroud gas cap 140. Since these sidewall surfaces are tapered to mate, as shown in FIGURE 9, by screwing the cap 140 in and out of the nozzle nut holder 130, the size of the annulus may be varied. These tapered sidewalls also direct the shroud gas passing through annulus 161 at the flame and powder. The gas is supplied to the annulus 161 from the annular opening 132 which communicates directly with the annulus 161. By the proper arrangement and adjustment of these openings 74 and annulus 161, the shroud will effectively encompass the flame and protect the flame and powder from the surrounding atmosphere.

The rotation of the shroud nozzle cap 140 in its threaded engagement in the nozzle nut holder 130 will move the cap 140 relative to the outer end of the nozzle 156. This will vary the distance from the outer end of nozzle 156 at which the shroud gas flowing from openings 74 and annulus 161 contacts the flame and the advancing powder. In this manner, the cross-sectional configuration of the flame and powder being emitted may be changed from a circular to an oval configuration. Accordingly, a wide band of deposited material will result which will, for certain powders, improve the manner of application of the powdered material. The width of this band may be varied by moving the adjustable gas cap 140 in or out of the nut holder 130. This changes, not only the points of contact, with the flame and powder of the gas passing from openings 74, but also varies the size of the annulus 161, both of which affect the configuration of the band.

Referring back to the head portion 90 of the front tube assembly, the passageway 160 has been drilled so that it extends beyond its juncture with the passageway 162. The powdered materials that are used for the coating may be very abrasive when conveyed at high speeds and under pressure. Accordingly, when the direction of travel of these powdered materials is changed, as at the juncture of the passageways 160 and 162, they tend to abrade and wear the outermost side of this corner. To prevent this, the passageway 160 has been drilled out to form the extension 164 which acts as a pocket which fills with the powdered material being conveyed. This pocket, which is one diameter wide, is located at the point which is subjected to essentially all of the wear from abrasion. Accordingly, this protects the head unit from wear at this point.

The use of the nozzle nut block 92 and of the adjustable nozzle nut holder 130 provide for the interchangability of various nozzles as may be desired. For example, nozzles having a finer bore may be used where powdered materials having especially fine particles are used. In addition, the entire front tube assembly may be deplaced by simply unscrewing the nut 84 from the handle assembly 78. This allows the use of various nozzles and parts necessary for spraying a wide variety of powders.

The use of the compartment 40 in the torch allows the use of one gas for both powdered material carrier and shroud purposes. Furthermore, this provides a completely closed system as regards the carrier source and powder source, the only outlet for this system being the centrally disposed nozzle opening 66. Due to the fact that this is the only outlet for this system, the additional head established by use of by-pass tube 230, provides a means for the automatic purging or clean-out of the tubular conduit 62 and torch passageways which convey the carrier gas and the powder entrained therein to opening 66.

Furthermore, by this arrangement no valve contacts the abrasive powdered material used for the coatings. The valve 42 controls in an on-off manner the flow of carrier gas from the compartment 40 to the proportioner assembly. The amount of powder flowing from the carburetor 60 during an operation is controlled by the pressure reducing regulators 48 and 50.

As can be seen from FIGURES 2 and 3, the valves 42 and 76 which control the amount of powder taken from the carburetor and the amount of gas which is conveyed to form the shroud are located immediately in front of the gripping portion 80 of the handle assembly. This arrangement of the valves 42 and 76 provide for one-handed control of the spraying process to a great extent. The right-hand, coarse threaded valve 42 which operates in an on-off manner, controls the flow of powder supplied to the nozzle. The left-hand fine-thread valve 76, which operates in a throttling or modulating manner, will control the amount of gas passing from the compartment 40 to form the shroud. As one can readily see, the operator can completely shut off the supply of powder and shroud gas, leaving the flame burning, whereby the torch may be used for pre-heating or after heating, using only the thumb of the hand with which he is gripping the torch. Furthermore, during the coating process, the shroud gas may be regulated in the same manner, still leaving the operator's other hand free for other functions.

The use of the valves 26 and 32 at the rear of the torch to control the amount of oxygen and fuel gas that are supplied to the flame provide immediate control of these gases since these valves are connected to the torch. Thus the proper mixture of fuel gas and oxygen may be achieved or the mixture adjusted during the spraying or heating operation. In addition, the volume of fuel gas and oxygen being burned can be controlled by adjustment of the pressure reducing regulators 15.

The present invention as illustrated by the preferred embodiment described herein achieve the objects set forth at the onset. A simplified system has been devised for flame spraying powdered materials which gives good control over the process, much of the control being performed in a one-handed manner. A flame spraying tool or torch has been provided which simplifies the manufacture and use of the tool. Various nozzles for the torch may be readily interchangeable and the pattern of the powder being sprayed may be varied to bring about an oval configuration, whereby optimum application of certain powders is easily obtained. The use of the bypass tube in the powder container, whereby the pressure above the powder material in the container is equalized with the outlet pressure in the carburetor, brings about an automatic purging or clean-out of the conduit and passageways carrying the powder and entraining gas to the nozzle portion of the torch when the powder flow is stopped.

The present invention is well adapted to carry out the objects and to attain the ends and advantages mentioned as well as others inherent therein. While the presently preferred embodiment of the invention has been given for the purpose of disclosure, numerous changes in the detail of construction and the combination, shape, size and arrangement of parts may be resorted to without departure from the spirit and scope of the invention as hereinafter claimed.

What is claimed is:

1. A tool for flame spraying a powdered material comprising,
    a body having first and second ends,
    a nozzle portion connected to the first end of the body,
    a first passageway in said body through which material entraining gas may be supplied under pressure to the nozzle,
    passageway means in the body for intermixing and supplying under pressure to the nozzle a fuel gas and a combustion sustaining gas,
    a first compartment in the body, a passageway to the first compartment for conveying a carrier gas to the compartment,
    a shroud gas passageway extending between the first compartment and the nozzle portion,
    a powder control passageway extending from the first compartment through which gas may be supplied for entrainment of the powdered material for conveyance through the first passageway,
    a shroud control valve operatively connected to the shroud gas passageway for controlling the gas flowing therethrough from the first compartment,
    a powder control valve operatively connected to the powder control passageway for controlling the gas flowing therethrough from the first compartment,
    each of the shroud and powder control valves being comprised of manually operated knob means for controlling the valves, a gripping portion on said body, the manually operated knob control means for the shroud and powder control valves being located adjacent to said gripping portion and between the gripping and nozzle portions, whereby an operator can grasp the tool with one hand and operate the two said knob means with the thumb of said one hand,
    a fuel gas control valve, and
    a combustion sustaining gas control valve, both of said last named control valves being positioned at the second end of the body.

2. The invention of claim 1 wherein the nozzle portion is further defined as including,
    a first centrally disposed opening connected to the first passageway for emission of the material entraining gas,
    a first series of openings connected to said passageway means and being located around said first opening,
    a second series of openings connected to the shroud gas passageway for emission of gas from the first compartment to form a shroud, and further including, adjustment means for adjusting the direction of emission of the shroud forming gas.

3. The invention of claim 2 wherein the nozzle portion is further defined as including,
    a nozzle, said first opening and said first series of openings being located in said nozzle,
    a shroud cap, said second series of openings being located in said shroud cap, and said shroud cap being mounted about said nozzle by said adjustment means for adjustment relative to said nozzle.

4. The invention of claim 3 wherein the nozzle end of the torch is further defined as including,
    a head,
    a nozzle seat block threadingly engaging the head,
    an adjustable nozzle nut holder threadingly engaging the seat block,
    the nozzle being secured between the seat block and the nozzle nut holder, a first end of said nozzle extending outwardly therefrom and containing the opening and the first series of openings, and
    the adjustable shroud gas cap being secured to the nozzle nut holder whereby it may be adjusted relative to the nozzle.

5. The invention of claim 3 wherein,
    the nozzle has a first and second end, said opening and said first series of openings being located in the first end of said nozzle,
    the cap is generally cylindrically shaped and is mounted about the nozzle for adjustment along an axis of the nozzle extending between said ends, and
    the second series of openings are directed inwardly toward a point which is a predetermined distance in front of said first nozzle end, said distance varying as the cap is adjusted along said nozzle axis.

6. The invention of claim 5 wherein the adjustable cap is further defined as having,
    a first position in which at least a circumferential portion of the inside surface of said cylindrically shaped cap contacts the nozzle, thereby forming a seal between the nozzle and the cap, and
    a second position in which the inside surface is spaced from the nozzle,
    the space between said nozzle and cap being in communication with the shroud gas passageway and varying in size with the movement of the circumferential portion of the cap toward or away from the second end of the nozzle, said movement being brought about by adjustment of the cap along said nozzle axis.

7. A system for flame spraying powdered material comprising,
    a source of powdered material,
    an entraining chamber operatively connected to said material source for receiving a continuous supply of said material,
    first, second and third gas sources, the first gas being a fuel gas and the second, a combustion sustaining gas, each of said gas sources supplying its respective gas under pressure,
    a flame spraying torch,
    a nozzle on one end of said torch, said nozzle being comprised of,
    an opening,
    a first series of openings,
    a second series of openings,
    individual conduits connecting each of the gas sources to the other end of said torch,
    means for conveying, inter-mixing and ejecting under pressure from the first series of openings said first and second gasses, whereby they may be ignited to form a continuous flame at said nozzle,
    a first compartment in said torch,
    conduit means for conveying the third gas under pressure to said first compartment,
    means for diverting a portion of said third gas from said first compartment to the material entraining chamber, and introducing it under pressure into the chamber, whereby powder is entrained in the gas, said diverting means including,
    a conduit extending from said first compartment to the chamber, and
    a manually operated powder control valve located on said torch and being operatively connected to said last mentioned conduit for controlling the flow of gas diverted to said entraining chamber, and in turn, the flow from said chamber of entrained gas and powder, conduit connected between said chamber and the centrally disposed opening for conveying the powder entraining gas from the chamber and ejecting it under pressure from said opening, passageway means in said torch connecting the first compartment to the second series of openings, whereby a portion of the gas in the compartment is ejected from said second series of openings under pressure, a manually operated shroud control valve located on said torch and operatively connected to said passageway means for controlling the amount of gas allowed to pass through said second series of openings, a gripping portion on the torch, said powder and shroud control valves being located adjacent the gripping portion and between said gripping portion and the nozzle end of the torch, whereby an operator can grasp the torch with one hand and operate the powder and shroud control valves with the thumb of said one hand, a fuel gas control valve located at the other end of said torch and operatively connected to the conduit connecting the first gas source to the torch for control of gas flowing therethrough, and a combustion sustaining gas control valve located at said other end of said torch and operatively connected to the conduit connecting the second gas source to the torch for controlling the flow of gas therethrough.

8. The invention of claim 7 wherein said diverting and introducing means is further defined as including, a proportioner assembly comprised of,
a first inlet into said chamber,
a second inlet into said chamber,
means for conveying a portion of the third gas to each of said first and second inlets, and
valve means for individual regulation of the quantity and pressure of gas passing to each of said inlets.

9. The invention of claim 8 wherein said inlets include, at least one jet in each inlet for the introduction of the third gas into the chamber,
the jet in the first inlet extending substantially parallel to the bottom of the chamber, and
the jet in the second inlet extending generally toward the bottom of the chamber.

10. The invention of claim 9 wherein the conveying, intermixing and ejecting means is further described as including, a second compartment in said torch,
conduit connecting the fuel and combustion supporting gas sources to the second compartment, and
control valves in said conduit adjacent the torch for regulating the amount of fuel and combustion supporting gas conveyed to the second compartment.

11. The invention of claim 10 wherein, the powdered material source is comprised of a hopper mounted on top of the chamber, the hopper being partially filled with the powdered material, and
the entraining chamber has an outlet connected with the powder entrained gas conduit, and including,
a by-pass tube connecting the outlet to the interior of the hopper at a point above the material contained in the hopper, whereby the pressure in the hopper above the material is equalized with the pressure in the outlet.

12. The invention of claim 11 wherein, the powdered material entraining chamber is partially comprised of a bottom and sidewalls, and further including,
a metering tube suspended within said chamber, the bottom of said tube being a pre-determined distance from the bottom of the chamber.

13. The invention of claim 12 wherein the sidewalls of said chamber and of said metering tube taper inwardly from the top to the bottom of said sidewalls.

14. A device for applying powdered material as a coating, comprising, a fuel gas source,
a flame sustaining gas source,
a carrier gas source,
a torch having a gripping portion and including,
nozzle means on one end thereof, said nozzle means comprised of,
a centrally disposed opening,
a first series of openings disposed about said first opening, and
a second series of openings lying outside the first series of openings, said torch further including,
a first compartment near said nozzle end in communication with said first series of openings, and
a second compartment,
passageways connecting the second compartment with said second series of openings,
a shroud control valve operatively connected to the passageways for regulating the amount of gas through the passageways, and being located adjacent to the gripping portion between the nozzle means and said gripping portion,
first and second conduit means connecting said fuel gas source and said flame sustaining gas source, respectively, to said first compartment said fuel gas and flame sustaining gas becoming intermixed as they are introduced into said compartment,
valves at the end of the torch opposite the nozzle end, operatively connected to each of the first and second conduit means,
third conduit means connecting the carrier gas source to said second compartment for conveying the carrier gas to said second compartment,
carburetor means including,
a chamber having sidewalls that taper inwardly from the top to the bottom of the chamber,
a metering tube suspended above the bottom of the chamber and having sidewalls tapering inwardly from the top of the tube to the bottom, and
an outlet,
a powder container connected to said carburetor means for supplying powdered material to said carburetor means through said tube,
a by-pass tube connecting the outlet to the upper portion of the powder container,
fourth conduit means connecting said second compartment to said carburetor means for conveying at least a portion of the gas introduced into said second compartment to said carburetor means for entrainment of the powdered material therein,
a powder control valve operatively connected to said fourth conduit means for controlling the flow of gas through the fourth conduit and being located adjacent the gripping portion between the nozzle means and the gripping portion, and
fifth conduit means connecting the carburetor outlet to the centrally disposed opening for conveying the powder and entraining gas from the carburetor through said opening.

References Cited

UNITED STATES PATENTS

| 2,072,845 | 3/1951 | Benoit | 239—85 |
| 2,549,736 | 4/1951 | Wiese | 239—85 |
| 2,594,222 | 4/1952 | Sandora et al. | 239—85 |
| 2,726,118 | 12/1955 | Jones et al. | 239—85 |
| 2,813,750 | 11/1957 | Marantz | 239—85 |

FOREIGN PATENTS

| 263,739 | 5/1948 | Switzerland. |

EVERETT W. KIRBY, *Primary Examiner.*